United States Patent [19]

Blomquist

[11] 4,240,532
[45] Dec. 23, 1980

[54] TORSIONAL ISOLATOR FOR TORQUE CONVERTER LOCK-UP MECHANISM

[75] Inventor: Alfred P. Blomquist, Farmington Hills, Mich.

[73] Assignee: Chrysler Corporation, Highland Park, Mich.

[21] Appl. No.: 944,459

[22] Filed: Sep. 21, 1978

[51] Int. Cl.³ .................... F16D 33/00; F16D 3/14
[52] U.S. Cl. ............................. 192/3.28; 192/106.2
[58] Field of Search ............... 192/302, 3.28, 3.29, 192/3.3, 3.31, 106.2; 64/27 C; 60/338, 361

[56] References Cited

U.S. PATENT DOCUMENTS

| | | | |
|---|---|---|---|
| 3,497,043 | 2/1970 | Leonard | 192/3.3 |
| 4,113,075 | 9/1978 | Walker | 192/3.31 |
| 4,138,003 | 2/1979 | Malloy | 192/3.29 |
| 4,143,561 | 3/1979 | Melhorn | 60/338 |

*Primary Examiner*—George H. Krizmanich
*Attorney, Agent, or Firm*—Newtson & Dundas

[57] ABSTRACT

An improved damper is provided for minimizing the transmittal of engine generated torsional vibrations through a transmission employing a hydrokinetic torque converter when the torque converter is operated in a locked up mode wherein the turbine and impeller thereof are mechanically interconnected. The damper includes a drive ring drivingly engageable with the impeller of the torque converter and configured to define an annular channel having a plurality of spring pockets formed therein, a plurality of springs received in the pockets, and a driven ring which may be secured for rotation with the turbine of the torque converter and having a plurality of drive lugs for engaging the springs. The drive ring pockets further include spring seats configured to urge the springs in a direction opposing centrifugal force and the driven ring lugs are formed to facilitate snap fit of the springs into engagement therewith.

13 Claims, 4 Drawing Figures

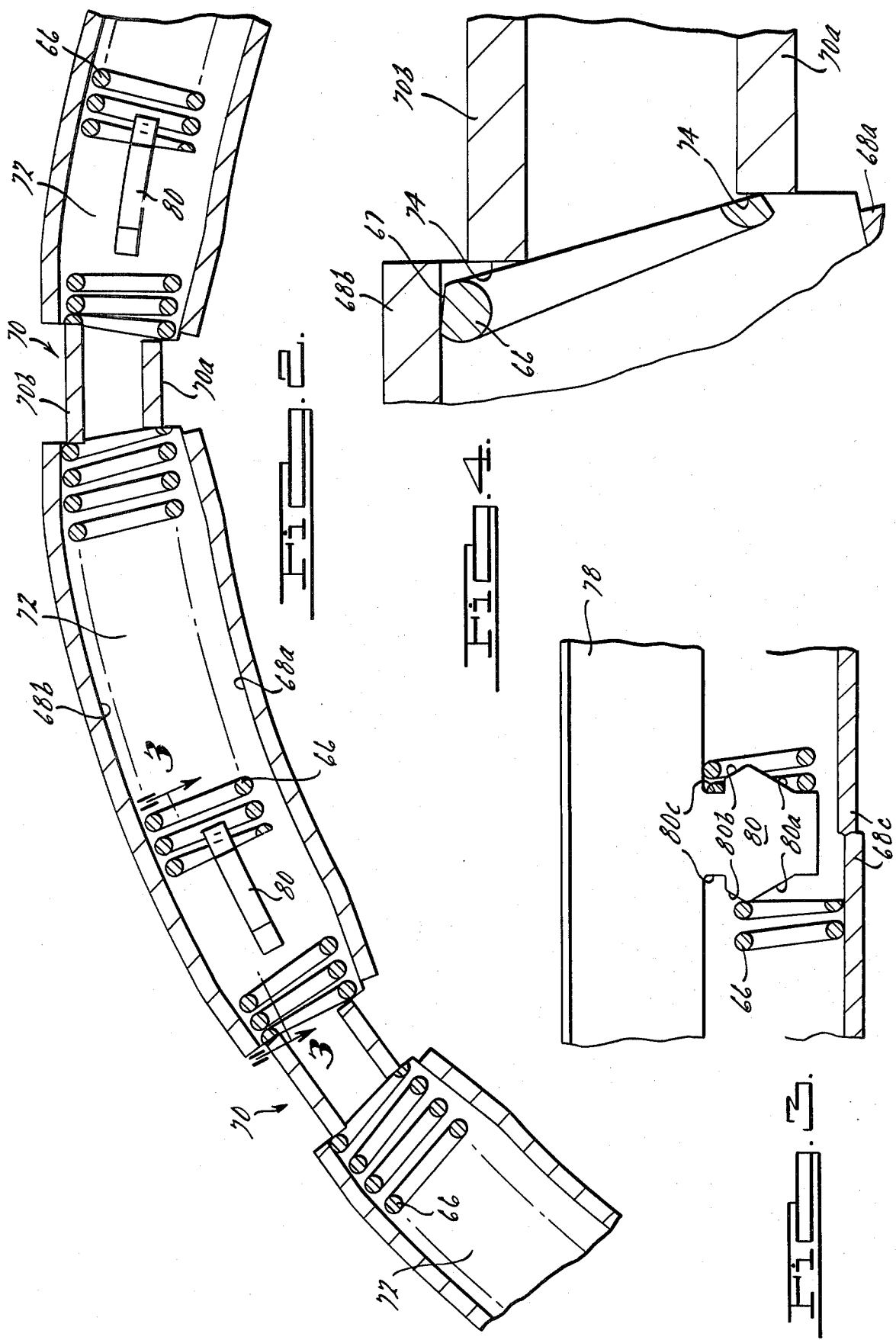

TORSIONAL ISOLATOR FOR TORQUE CONVERTER LOCK-UP MECHANISM

BACKGROUND OF THE INVENTION

1. Field of Invention

The present invention relates generally to torsional vibration dampers and more specifically to such dampers employed in power transmissions having hydrokinetic torque converters.

2. Description of the Prior Art

While mechanisms for damping the torsional vibrations delivered from automotive engines to vehicle drive trains have long been known in the art, their use has heretofore been primarily limited to manually clutched transmissions. Damping has been effected in automatic transmission systems by the hydrokinetic torque converters typically employed. With present day attempts to improve vehicle fuel economy, however, automatic transmissions frequently have modes of operation in which the torque converter section is mechanically locked up to prevent power waste due to slippage in direct drive. During such modes of operation, a torsional isolator or damper must be provided; and the prior art designs are not directly adaptable to serve this purpose, since they have been insufficiently compact to permit their required installation within the automatic transmission. They have also been objectionably expensive for this purpose.

SUMMARY OF THE INVENTION

Briefly, this invention comprises a torsional vibration isolating mechanism for an automotive automatic power transmission employing a hydrokinetic torque converter operable in a mechanically locked mode.

A primary object of the invention is to provide such a mechanism which is compact and economical to manufacture.

It is another object to provide such a mechanism including means for carrying resilient elements in a manner enhancing their capability of effecting the desired damping.

It is yet another object to provide simple economical means for effecting assembly of the mechanism into the transmission.

BRIEF DESCRIPTION OF THE DRAWINGS

FIG. 2 is a partial cross sectional view of the channel portion of the isolator of the present invention taken along line 22 of FIG. 1 and illustrated in an operative mode.

FIG. 3 is a two position partial elevational view of the invention isolator illustrating means for assembling the parts thereof in driving relationship.

FIG. 4 is an enlarged cross sectional view of the spring seat portion of the channel of FIG. 2.

DESCRIPTION OF THE PREFERRED EMBODIMENT

Figure 1:
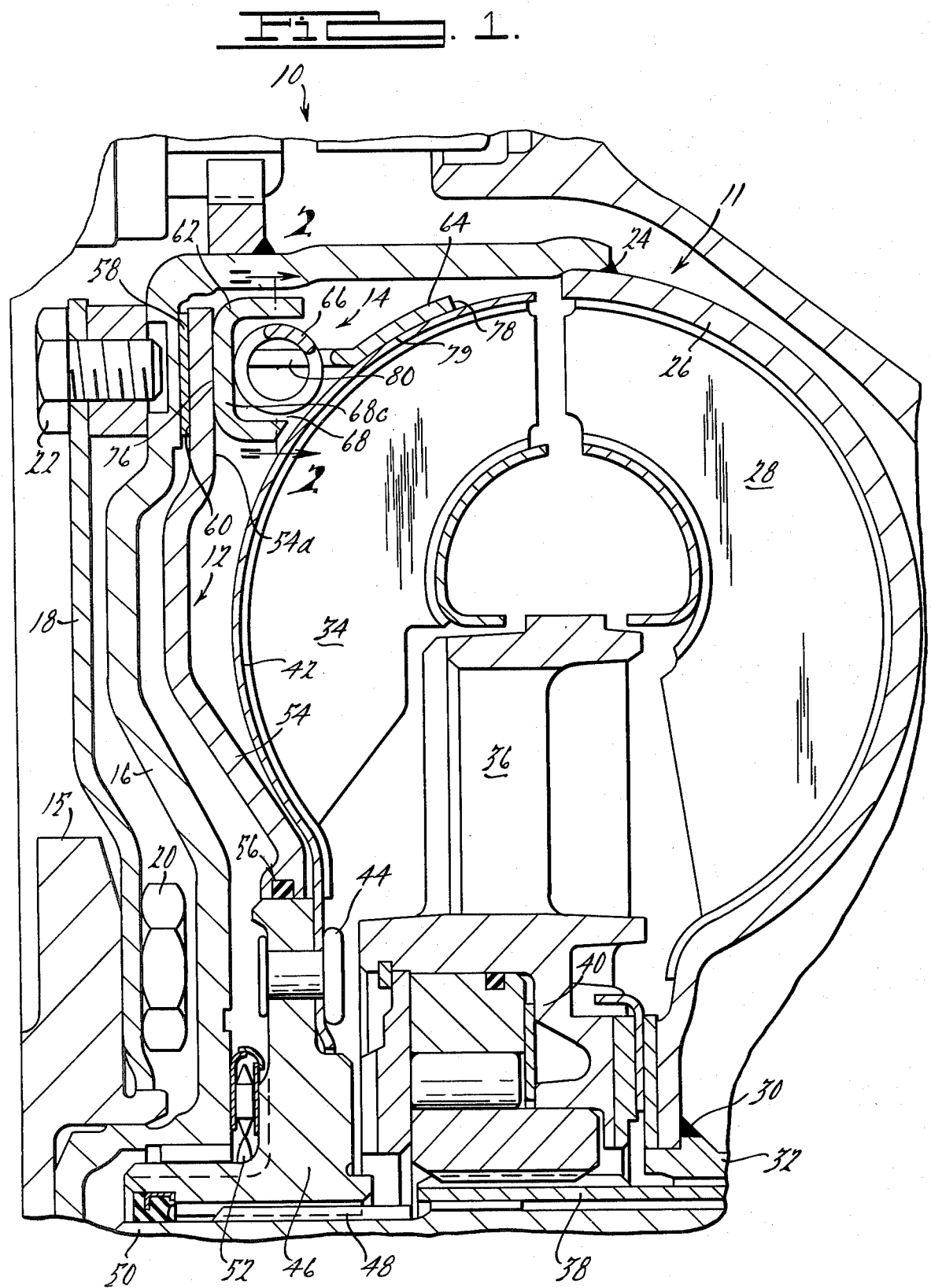
FIG. 1 is a partial cross sectional view of an automatic power transmission embodying the torsional isolator mechanism of the present invention.

Referring now to the drawings and in particular to FIG. 1, an automatic power transmission 10 is illustrated as including generally a torque converter portion 11 and lock-up mechanism 12 therefor preferably of the type described in a copending application of applicant and S. A. Mikel assigned to the assignee of the present invention to be herein described.

The torque converter portion 11 is normally operative to transmit power in a fluid drive relationship from a prime mover such as an automobile engine to the change speed gear box (not shown) of the transmission 10.

Power is transmitted from the crankshaft 15 of the engine to a front cover member 16 of the transmission 10 through a plate member 18. Plate member 18 is secured proximate its inner periphery to the crankshaft 14 by suitable fasteners such as bolts 20 and is likewise secured proximate its outer periphery to the cover member 16 by suitable fastening means such as bolts 22. The cover member 16 is secured, as by welding at 24, to a shell portion 26 of the impeller assembly 28 of the torque converter portion 11 of the transmission 10. The shell portion 26, in turn, is secured, as by welding at 30, to a pump drive shaft 32, which is drivingly engaged to a suitable well-known positive displacement pump (not shown) from which fluid is supplied the torque converter portion 11 in a known manner.

The impeller 28 is fluidly connected in toroidal flow relationship in a known manner with a turbine assembly 34 and a stator assembly 36. The stator assembly 36 is connected to a stationary reaction shaft member 38 through a known one-way clutch assembly 40 which permits rotation only in the direction of the impeller 28. The turbine assembly 34 includes a shell portion 42 which is secured by rivets 44 or the like to a turbine hub member 46 which is drivingly connected, as by a splined connection 48, to an input shaft 50, by which the change speed gear box (not shown) of the transmission is drivingly engaged. The hub member 46 is preferably spaced from the front cover 16 by an antifriction member such as the roller bearing illustrated at 52. An annular piston member 54 is slidingly sealingly mounted for axial and rotary movement on an outer diameter of the turbine hub member 46 through sealing means 56. An annular disc shaped frictional element 58 is carried proximate the outer periphery of the cover member 16 for engagement with a cooperating annular surface 60 of the piston member 54 when control means (not shown) urge the piston member 54 leftward as viewed in FIG. 1. It is by this frictional engagement that the torque converter portion 11 is locked up, the final mechanical connection being effected by the torsional isolator 14 of the present invention, which is disposed axially intermediate the piston member 54 and the turbine shell portion 42. Vibratory motion of the crankshaft 15 is damped by the isolator 14 as it is transmitted to the turbine shell portion 42.

Considering the isolator 14 now in greater detail, it is illustrated as comprising generally a drive ring 62, a driven ring 64, and a plurality of resilient members such as helical compression springs 66.

The drive ring 62 is preferably formed as a unitary sheetmetal stamping defining an annular rearward facing (rightward as viewed in FIG. 1) channel 68 deformed inward at a plurality of circumferentially spaced locations as illustrated at 70 in FIG. 2 to define a plurality of pockets 72 for receiving the springs 66. In a preferred embodiment, ten such pockets are formed. The deformations 70 consist of a relatively short radially inner tab 70a produced by deforming the inner wall 68a of the channel 68 and a radially outer relatively long outer tab 70b produced by deforming the outer wall 68b of the channel 68. This produces an inwardly canted seat 74 (as may best be seen in FIG. 4) for receiving one end of the springs 66 for a purpose to be hereafter described. The flat base wall 68c of the channel 68 is secured, preferably by electron beam welding at 76 to a rearward facing surface 54a of the piston member 54 at a radial location opposite the annular surface 60.

The driven ring 64 is likewise preferably formed as a sheetmetal stamping including a curved base portion 78 formed to abuttingly engage the tubine shell portion 42 to which it is preferably electron beam welded as at 79. The driven ring 64 further includes a plurality forward projecting drive lugs 80 which may best be seen in FIG. 3. The lugs 80 are configured to receive and retain one end of the springs 66 in snap fit relationship to facilitate assembly of the isolator 14. The lugs 80 include diverging ramp portions 80a, converging ramp portions 80b, and retaining pockets 80c positioned adjacent the base portion 78.

It may be appreciated by reference to the split view of FIG. 3 that as the piston member 54 is assembled onto the turbine hub member 46, carrying the drive ring 62 with springs 66 loosely assembled in the pockets 72 thereof, the end of the spring 66 contacts first the diverging ramp portion 80a and slides therealong until it drops down the converging ramp portion 80b into the retaining pocket 80c. This permits the blind assembly required by the typical generally cylindrical housing configuration illustrated in FIG. 1.

In operation, torsional vibratory changes in motion transmitted from the crankshaft 15 through the front cover 16, the friction disc 58, and the piston member 54 to the shell portion 42 are damped by operation of the springs 66. When there is relative rotary motion between the piston member 54 and the turbine shell portion 42, the springs 66 deflect between positions established by the relative positions of the seats 74 of the drive ring 62 and the lugs 80 of the drive ring 64. Freedom for such deflection is assured by provision of the angular positioning of the seats 74. An inward cant, as may best be seen in FIG. 4, preferably of about 20° from an axis normal to the radius of the channel 68, tends to bias springs 66 which preferably include end chamfers 67 inward against the operation of centrifugal force on the rotating assembly, thus preventing undesirable rubbing of the springs 66 on the outer wall 68a of the channel.

While only one embodiment of the present invention has been described, others may be possible without departing from the scope of the appended claims.

What is claimed is:

1. In an automatic power transmission for transmitting power from an engine to a drive train of the type having a torque converter with an impeller portion and a relatively rotatable turbine portion, an annular lock-up piston member mechanically lockingly engageable with one of the portions, and torsional isolating means for damping the motion transmitted from the engine through the piston member and the portions, an improvement wherein said torsional isolating means comprises:

A. a drive ring member;
   B. first means for fixedly securing said drive ring member to said piston member;
   C. a driven ring member;
   D. second means for fixedly securing said driven ring member to one of said torque converter portions;
   E. a plurality of spring members operatively engaged between said drive and driven ring members for damping vibratory relative motion therebetween; and
   F. means integrally formed with said drive member for defining a plurality of spring seats for engaging one end of each of said spring members.

2. Torsional isolating means as defined in claim 1 and further comprising:

G. means integrally formed with said driven ring member for drivingly engaging the other end of each of said spring members in snap fit relationship.

3. Torsional isolating means as defined in claims 1 or 2 wherein said first and second means for fixedly securing comprise electron beam weldments.

4. Torsional isolating means as defined in claims 1 or 2 wherein said drive ring comprises a stamping of generally U-shaped cross section having a closed base portion secured in axially abutting relationship with said annular piston member and radially inner and outer side walls extending axially therefrom toward said one torque converter portion to define a channel for receiving said spring members and wherein said means for defining spring seats comprises a plurality of pairs of tabs created by deforming said radially outer side wall inward and radially inner side wall outward at a plurality of circumferentially spaced locations.

5. Torsional isolating means as defined in claim 4 wherein said pairs of tabs each comprise a relatively short radially inner tab and a relatively long radially outer tab in radial juxtaposition therewith whereby each spring seat is formed as a radially inward canted seat for receiving said one end of said spring members.

6. Torsional isolating means as defined in claims 2 or 5 wherein said driven ring member comprises an annular stamping having a base portion secured to said one torque converter portion and said means integrally formed with said driven ring member comprises a plurality of circumferentially spaced drive lugs projecting therefrom toward said drive ring member channel.

7. A torsional isolator for damping the vibratory rotary input of an engine to an automatic power transmission having a hydrokinetic torque converter operatively engaging a change speed gear box, the torque converter including an impeller portion drivingly engaged by the engine, a turbine portion fluidly interconnected with the impeller portion and drivingly engaging the change speed gear box, and a lock-up mechanism for mechanically interconnecting the impeller and turbine portions including an annular piston mechanically drivingly engageable with the impeller portion, said torsional isolator being operatively connected between said piston member and said turbine portion and comprising:

A. a drive ring member;
   B. first means for fixedly securing said drive ring member to said piston member;
   C. a driven ring member;
   D. second means for fixedly securing said driven ring member to said torque converter turbine portion;
   E. a plurality of spring members operatively engaged between said drive and driven ring members for damping vibratory relative motion therebetween; and
   F. means integrally formed with said drive member for defining a plurality of spring seats for engaging one end of each of said spring members.

8. A torsional isolator as defined in claim 7 and further comprising:

G. means integrally formed with said driven ring member for drivingly engaging the other end of each of said spring members in snap fit relationship.

9. A torsional isolator as defined in claims 7 or 8 wherein said first and second means for fixedly securing comprise electron beam weldments.

10. A torsional isolator as defined in claims 7 or 8 wherein said drive ring comprises a stamping of generally U-shaped cross section having a closed base portion secured in axially abutting relationship with said annular piston member and radially inner and outer side walls extending axially therefrom toward said torque converter turbine portion to define a channel for receiving said spring members and wherein said means for defining spring seats comprises a plurality of pairs of tabs created by deforming said radially outer side wall inward and radially inner side wall outward at a plurality of circumferentially spaced locations.

11. A torsional isolator as defined in claim 10 wherein said pairs of tabs each comprise a relatively short radially inner tab and a relatively long radially outer tab in radial juxtaposition therewith whereby each spring seat is formed as a radially inward canted seat for receiving said one end of said spring members.

12. Torsional isolating means as defined in claims 8 or 11 wherein said driven ring member comprises an annular stamping having a base portion secured to said torque converter turbine portion and said means integrally formed with said drive ring member comprises a plurality of circumferentially spaced drive lugs projecting therefrom toward said drive ring member channel.

13. In an automatic power transmission for transmitting power from an engine to a drive train of the type having a torque converter with an impeller portion and a relatively rotatable turbine portion, an annular lock-up piston member mechanically lockingly engageable with one of the portions, and torsional isolating means for damping the motion transmitted from the engine through the piston member and the portions, an improvement wherein said torsional isolating means comprises:

A. a drive ring member;
B. first means for fixedly securing said drive ring member to said piston member;
C. a driven ring member;
D. second means for fixedly securing said driven ring member to one of said torque converter portions;
E. a plurality of spring members operatively engaged between said drive and driven ring members for damping vibratory relative motion therebetween;
F. means defining a circumferential channel in one of said ring members for carrying said spring members; and
G. means integrally formed with said one ring member for defining a plurality of circumferentially disposed seats canted radially inwardly with respect to said one ring member for engaging one end of each of said spring members.

* * * * *